(12) United States Patent
DeRocher et al.

(10) Patent No.: US 10,494,530 B2
(45) Date of Patent: Dec. 3, 2019

(54) COATING COMPOSITION WITH PHOSPHORUS ACID-FUNCTIONALIZED LATEX PARTICLES AND ACID FUNCTIONALIZED DISPERSANTS

(71) Applicant: Rohm and Haas Company, Collegeville, PA (US)

(72) Inventors: Jonathan DeRocher, Coopersburg, PA (US); Kevin J. Henderson, Phoenixville, PA (US); Antony K. Van Dyk, Blue Bell, PA (US); Jingchun Yang, Collegeville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 80 days.

(21) Appl. No.: 15/836,097

(22) Filed: Dec. 8, 2017

(65) Prior Publication Data

US 2018/0171155 A1 Jun. 21, 2018

Related U.S. Application Data

(60) Provisional application No. 62/435,233, filed on Dec. 16, 2016.

(51) Int. Cl.
| | |
|---|---|
| *C09D 5/02* | (2006.01) |
| *C09D 7/00* | (2018.01) |
| *C09D 7/61* | (2018.01) |
| *C08J 3/20* | (2006.01) |
| *C08K 3/22* | (2006.01) |
| *C08K 9/12* | (2006.01) |
| *C09D 133/08* | (2006.01) |
| *C09D 143/02* | (2006.01) |
| *C09D 181/08* | (2006.01) |

(52) U.S. Cl.
CPC .............. *C09D 5/027* (2013.01); *C08J 3/203* (2013.01); *C08K 3/22* (2013.01); *C08K 9/12* (2013.01); *C09D 7/00* (2013.01); *C09D 7/61* (2018.01); *C09D 133/08* (2013.01); *C09D 143/02* (2013.01); *C09D 181/08* (2013.01); *C08K 2003/2241* (2013.01)

(58) Field of Classification Search
CPC ........ C09D 5/027; C09D 7/61; C09D 133/08; C09D 143/02; C09D 181/08; C08K 2003/2241; C08K 3/22; C08K 9/12; C08J 3/203
USPC ........................................................ 524/526
See application file for complete search history.

(56) References Cited

U.S. PATENT DOCUMENTS

| | | | |
|---|---|---|---|
| 7,179,531 B2 | 2/2007 | Brown et al. | |
| 8,710,133 B2 | 4/2014 | Bohling et al. | |
| 8,865,827 B2 | 10/2014 | Henderson et al. | |
| 8,877,852 B2 | 11/2014 | Bohling et al. | |
| 9,346,972 B2 | 5/2016 | Bohling et al. | |
| 9,469,749 B2 | 10/2016 | DeRocher et al. | |
| 2015/0080521 A1 | 3/2015 | Korenkiewicz et al. | |
| 2016/0168409 A1* | 6/2016 | Booth ...................... | C09C 1/36 524/502 |
| 2018/0002557 A1 | 4/2018 | Tomko et al. | |

FOREIGN PATENT DOCUMENTS

| | | |
|---|---|---|
| WO | 2008119887 A1 | 10/2008 |
| WO | 2013169676 | 11/2013 |

OTHER PUBLICATIONS

Search report from corresponding European 17204245. 9application, dated Apr. 10, 2018.

* cited by examiner

*Primary Examiner* — Hui H Chin
(74) *Attorney, Agent, or Firm* — Reid S. Willis

(57) ABSTRACT

The present invention relates to a composition comprising: a) an aqueous dispersion of i) polymer particles functionalized with structural units of a phosphorus acid monomer; and ii) $TiO_2$ particles; b) a sulfur acid functionalized dispersant; and c) a carboxylic acid functionalized dispersant. The composition of the present invention addresses a need in the art by providing a way to tune $TiO_2$-binder composite formation efficiency with relative ease.

10 Claims, No Drawings

COATING COMPOSITION WITH PHOSPHORUS ACID-FUNCTIONALIZED LATEX PARTICLES AND ACID FUNCTIONALIZED DISPERSANTS

BACKGROUND OF THE INVENTION

The present invention relates to a coating composition comprising phosphorus acid-functionalized latex particles, $TiO_2$ particles, a sulfur acid functionalized dispersant, and a carboxylic acid functionalized dispersant.

The improvement of the distribution of $TiO_2$ particles in a paint film is a longstanding goal in the coatings industry. As the concentration of $TiO_2$ in a formulation increases, diminishing opacity returns are observed due to "crowding" of $TiO_2$, wherein clusters of $TiO_2$ particles act as a single, somewhat larger $TiO_2$ particle rather than as independent scattering centers.

Phosphoethyl methacrylate (PEM)-containing binders have proven to be very useful in addressing this problem because they adsorb to the surface of $TiO_2$ particles, resulting in much better spacing and consequently better scattering efficiency. This improved spacing allows the formulator to enhance performance using the same amount of $TiO_2$ or to match opacity at lower $TiO_2$ levels.

In practice, the kinetics of binder adsorption to $TiO_2$ must be tuned properly to obtain these improvements. If adsorption is too slow, no appreciable adsorption will occur during the paint making process; consequently, either the opacity will be indistinguishable from that obtained using a conventional binder, or composite formation will continue to occur after the paint has been fully formulated, resulting in a dramatic rise in viscosity during storage. If, on the other hand, binder adsorption is too rapid, large aggregates of binder and $TiO_2$ (grit) will form, resulting in lower opacity, lower gloss, and poor surface smoothness. When the kinetics are properly optimized, most of the composite particles will consist of latex particles adsorbing to discreet, non-agglomerated $TiO_2$ particles, thereby resulting in higher opacity.

The kinetics of adsorption for a particular $TiO_2$/latex pairing is highly dependent on the surface chemistry of both materials. Consequently, binder suppliers must produce a range of products with different PEM levels for use with the full range of $TiO_2$ grades that paint manufacturers might want to use. Additionally, paint manufacturers may not be able to switch $TiO_2$ grades to take advantage of $TiO_2$ pricing or availability without also switching the binder grade they use.

It would therefore be an advantage in the art to provide a way for formulators to readily optimize the kinetics of adsorption for a wide array of adsorbing binders and $TiO_2$ grades.

SUMMARY OF THE INVENTION

The present invention addresses a need in the art by providing a composition comprising:
a) an aqueous dispersion of:
  i) polymer particles functionalized with from 0.1 to 2 weight percent structural units of a phosphorus acid monomer or salt thereof, based on the weight of the polymer particles; and
  ii) $TiO_2$ particles;
b) a first dispersant having an $M_n$ in the range of from 500 to 20,000 Daltons and comprising from 50 to 100 percent by weight structural units of a sulfur acid monomer or a salt thereof, based on the weight of the first dispersant; and
c) a second dispersant having an $M_n$ in the range of from 300 to 50,000 Daltons and comprising from 20 to 100 weight percent structural units of a carboxylic acid monomer or a salt thereof, based on the weight of the second dispersant; wherein the weight to weight ratio of the first to the second dispersant is from 25:75 to 90:10; and wherein the weight percent of the first and second dispersants is from 0.1 to 10 weight percent, based on the weight of the polymer particles and the $TiO_2$ particles.

The composition of the present invention addresses a need in the art by providing a way to tune $TiO_2$-binder composite formation efficiency with relative ease.

DETAILED DESCRIPTION OF THE INVENTION

The present invention is a composition comprising:
a) an aqueous dispersion of:
  i) polymer particles functionalized with from 0.1 to 2 weight percent structural units of a phosphorus acid monomer, based on the weight of the polymer particles; and
  ii) $TiO_2$ particles;
b) a first dispersant having an $M_n$ in the range of from 500 to 20,000 Daltons and comprising from 50 to 100 percent by weight structural units of a sulfur acid monomer or a salt thereof, based on the weight of the first dispersant; and
c) a second dispersant having an $M_n$ in the range of from 300 to 50,000 Daltons and comprising from 20 to 100 weight percent structural units of a carboxylic acid monomer or a salt thereof, based on the weight of the second dispersant; wherein the weight to weight ratio of the first to the second dispersant is from 25:75 to 90:10; and wherein the weight percent of the first and second dispersants is from 0.1 to 10 weight percent, based on the weight of the polymer particles and the $TiO_2$ particles.

The polymer particles functionalized with structural units of the phosphorus acid monomer or a salt thereof are preferably acrylic, styrene-acrylic, or vinyl ester-acrylic (more particularly vinyl acetate-acrylic) polymer particles. The polymer particles preferably further comprise structural units of one or more of the following monomers: methyl methacrylate, butyl acrylate, ethyl acrylate, 2-ethylhexyl acrylate, ureido methacrylate, styrene, vinyl acetate, and vinyl versatate. The polymer particles may also include structural units of one or more of other monomers such as allyl methacrylate, divinyl benzene, diacetone acrylamide, and acetoacetoxyethyl methacrylate. The concentration of polymer particles is preferably in the range of from 10, more preferably from 20, and most preferably from 30, to 50 weight percent, based on the weight of the composition. The particle size of the polymer particles is preferably in the range of from 60 nm, more preferably from 80 nm, to 400 nm, more preferably to 300 nm, and most preferably to 200 nm, as measured by dynamic light scattering using a Brookhaven 90Plus particle size analyzer.

The weight percent of the phosphorus acid monomer is preferably from 0.2 weight percent to preferably 1, more preferably to 0.8, and most preferably to 0.5 weight percent, based on the weight of the phosphorus acid monomer functionalized polymer particles. As used herein, the term "phosphorus acid monomer" refers to a polymerizable compound containing at least one phosphorus atom and having at least one acidic proton. Examples of suitable classes of phosphorus acid monomers include phosphonic acid monomers and salts thereof and dihydrogen phosphate esters of an alcohol in which the alcohol contains or is substituted with a polymerizable vinyl or olefinic group, and salts thereof. Preferred dihydrogen phosphate esters are phosphates of hydroxyalkyl(meth)acrylates, including phosphoethyl methacrylate (PEM) and phosphopropyl methacrylates, with phosphoethyl methacrylate and salts thereof being especially preferred. An example of a suitable phosphonic acid is 2-(methacryloyloxy)ethyl phosphonic acid or a salt thereof.

As used herein, the term "structural units" refers to the groups formed upon the polymerization of the recited monomer. A structural unit of a phosphoethylmethacrylate is illustrated:

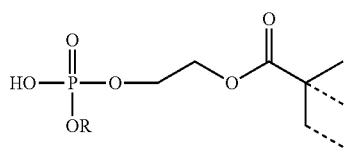

wherein the dotted lines represent the points of connectivity to the polymer backbone; wherein R is H or

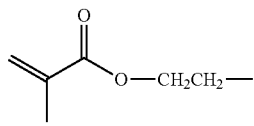

The concentration of $TiO_2$ particles is preferably in the range of from 10, more preferably from 20; to 70, more preferably to 60 weight percent, based on the weight of the composition.

The first and second dispersants are water-soluble in the proportions used. The first dispersant preferably comprises from 50 to 80 weight percent structural units of a sulfur acid monomer, preferably a sulfonic acid monomer or a salt thereof, based on the weight of the first dispersant. Examples of suitable sulfonic acid monomers include 2-acrylamido-2-methylpropane sulfonic acid (AMPS) and salts thereof, vinyl sulfonic acid and salts thereof, 2-sulfoethyl acrylate, 2-sulfoethyl methacrylate, 3-sulfopropyl acrylate, 3-sulfopropyl methacrylate, sodium styrene sulfonate, and 2-propene-1-sulfonic acid and salts thereof, as well as combinations thereof. A particularly preferred sulfonic acid monomer is 2-acrylamido-2-methylpropane sulfonic acid (AMPS) or a salt thereof.

The first dispersant preferably comprises from 15 to 45 weight percent structural units of one or more ancillary monomers, based on the weight of the first dispersant. Examples include acrylates and methacrylates such as methyl methacrylate, ethyl acrylate, butyl acrylate, ethyl hexyl acrylate, hydroxyethyl methacrylate, hydroxyethyl acrylate and 2-hydroxypropyl acrylate; carboxylic acid monomers such as acrylic acid and methacrylic acid; dialkylaminoalkyl acrylates and methacrylates including 2-(N,N-dimethylamino)ethyl methacrylate (DMAEMA), 2-(N,N-dimethylamino)ethyl acrylate, 2-(N,N-diethylamino)ethyl methacrylate, 2-(N,N-diethylamino)ethyl acrylate 2-(t-butylamino) ethyl methacrylate, 3-(dimethylamino)propyl acrylate, 2-diisopropylaminoethyl methacrylate, and 3-dimethylaminoneopentyl acrylate; polyalkylene glycol acrylates and methacrylates including poly(ethylene glycol) methacrylate, poly(ethylene glycol) acrylate, and lauryl-O—$(CH_2CH_2O)_{23}$-methacrylate; dialkylaminoalkyl acrylamides and methacrylamides including N-[2(N,N-dimethylaminoethyl]methacrylamide, N-[3-(N,N-dimethylamino)propyl] acrylamide, and N-[3-(N,N-dimethylamino)propyl]methacrylamide; acrylamidotrialkylammonium halides including [2-(acryloxy)ethyl]trimethylammonium chloride, [2-(methacryloxy)ethyl]trimethylammonium chloride, and 3-(methacrylamidopropyl)trimethylammonium chloride. Preferred ancillary monomers include 2-hydroxypropyl acrylate, hydroxyethyl methacrylate, and hydroxyethyl acrylate.

The number average molecular weight ($M_n$) of the first dispersant ranges from 500, preferably from 750, and more preferably from 1000 Daltons, to 20,000, preferably to 10,000, and more preferably to 5000 Daltons. The number average molecular weight ($M_n$) of the second dispersant ranges from 300, preferably from 500, and more preferably from 1000 Daltons, to 50,000, preferably to 20,000, more preferably to 10,000, and more preferably to 5000 Daltons The second dispersant preferably comprises from 40, more preferably from 50 weight percent structural units of a carboxylic acid monomer or a salt thereof, based on the weight of the second dispersant. Examples of suitable acid monomers include acrylic acid, methacrylic acid, and itaconic acid. Anhydrides such as maleic anhydride are also suitable since they form structural units of acid an acid monomer (maleic acid) upon hydrolysis. The second dispersant preferably includes from 15, more preferably from 20, to 50, more preferably to 45 weight percent structural units of an ancillary monomer such as one or more of those described as being suitable for the first dispersant. Examples of preferred ancillary monomers include diisobutylene, maleic anhydride, butyl methacrylate, styrene, 2-hydroxypropyl acrylate, hydroxyethyl methacrylate, and hydroxyethyl acrylate.

The weight-to-weight ratio of the first dispersant to the second dispersant is preferably from 35:65, more preferably from 40:60, most preferably from 45:55, to preferably 85:15, more preferably to 80:20. Preferably, the total weight percent of the first and second dispersants are in the range of from 0.2 to 5 weight percent, based on the weight of the polymer particles and the $TiO_2$ particles. It is also preferred that the total concentration of carboxylic acid functional groups in the combined dispersants is from 11, more preferably at least 15 weight percent, to 55, more preferably to 45, and most preferably 40 weight percent, based on the weight of total dispersants.

The coatings compositions of the present invention are advantageously prepared by first dispersing the $TiO_2$, under high shear in the presence of the first and the second dispersants to form a grind. The $TiO_2$ may additionally be provided as a pre-dispersed slurry stabilized by the dispersants, or the pigment may be distributed between multiple grinds or slurries comprising the dispersants. These pigment dispersions are then contacted with a phosphorus acid-functionalized dispersion of polymer particles to promote the adsorption of polymer particles onto the surfaces of the $TiO_2$ particles. The composition may further comprise polymer particles that are not functionalized with structural units of a phosphorus acid monomer or a salt thereof. It is also possible, though not preferred, to add the dispersion of polymer particles into the pigment dispersion. The mixture is then stirred sufficiently to maximize polymer particle adsorption onto pigment particles, followed by the addition of remaining paint ingredients.

Alternatively, these ingredients may be added immediately after, during, or before the combination the dispersions of pigment and polymer particles. The combination of the first and second dispersants provide a mechanism to control the kinetics of polymer particle adsorption to the $TiO_2$ particles in the paint formulation, thereby reducing upward viscosity drift, where the kinetics are too slow, or grit formation, where the kinetics are too fast. This invention therefore allows for the use of a single phosphorus acid-functionalized binder grade with a range of $TiO_2$ grades by merely changing the ratio of dispersants used. Furthermore, it has been discovered that loadings of phosphorus acid groups, particularly phosphorus acid groups arising from phosphoethyl methacrylate, can be dramatically reduced without suffering loss of hiding (S/mil).

The composition of the present invention may further comprise one or more of the following: rheology modifiers; fillers; colorants, surfactants; defoamers; preservatives; and neutralizing agents.

In another aspect, the present invention is a composition comprising an aqueous dispersion of a) composite particles, which are phosphorus acid-functionalized polymer particles adsorbed to $TiO_2$ particles, and b) the first and second dispersants.

EXAMPLES

Abbreviations

| | |
|---|---|
| 2-Acrylamido-2-methylpropane sulfonic acid | AMPS |
| n-Butyl Acrylate | BA |
| Hydroxypropyl Acrylate | HPA |
| Methacrylic Acid | MAA |
| Acrylic Acid | AA |
| Methyl Methacrylate | MMA |
| Phosphoethylmethacrylate | PEM |
| Ureido Methacrylate | UMA |
| Sodium Persulfate | NaPS |
| Polydispersity Index | PDI |

In the following examples, ACRYSOL™ and TERGITOL™ are Trademarks of The Dow Chemical Company or Its Affiliates. Dispersants 1 and 2 were prepared by conventional free-radical polymerization.

Intermediate Example 1—Preparation of 0.3% PEM Binder

A stage 1 monomer emulsion (ME1) was prepared by mixing DI water (157.6 g), sodium laureth sulfate (26.0 g, 31% active), BA (253.9 g), MMA (216.0 g), MAA (14.5 g), and PEM (8.5 g, 60% active). A stage 2 monomer emulsion (ME2) was prepared by mixing DI water (305.5 g), sodium laureth sulfate (36.0 g, 31% active), BA (579.5 g), MMA (560.8 g), and MAA (9.5 g). To a 5-L, four-necked round bottom flask equipped with a paddle stirrer, a thermocouple, $N_2$ inlet, and reflux condenser was added DI water (796.3 g) and sodium laureth sulfate (5.0 g, 31% active) and stirring was initiated. The contents of the flask were heated to 85° C. under $N_2$ and a portion of ME1 (100.0 g) was added to the kettle followed by a DI water rinse (40 g). The contents were stirred for 1 min, after which time a solution of NaPS (3.5 g) in DI water (10 g) was added followed by a DI water rinse (10 g). After another 5 min, the remainder of ME1 was added to the flask over 30 min. Concurrently, a solution of NaPS (3.3 g) in DI water (72.0 g) was fed separately to the flask at a rate of 0.7 g/min. After completion of addition of the ME1 feed, DI water (20 g) was added as a rinse and ammonia (12.40 g, 30% active) in DI water (10 g) was added to the co-feed. ME2 was then added to the flask over 90 min, along with an aqueous solution of UMA (44.1 g, 50% active) and a benzophenone solution in BA (21.3 g, 40% active benzophenone) added during this addition. After completion of ME2 feed, DI water (85 g) was added as a rinse. The contents of the flask were maintained at 85-87° C. during the additions. A solution of iron sulfate heptahydrate (0.02 g) and ethylenediaminetetraacetic acid, tetrasodium salt (0.02 g) in DI water (21.8 g) was then added along with a DI water rinse (10 g), after which time the batch was cooled to 30° C. while a redox pair was added to the kettle to reduce residual monomer level. After the redox pair was added and the contents reached a temperature between 30-40° C., a solution of aqueous ammonia (9.80 g, 28% conc.) in DI water (30 g) was added. A biocide was then added. The particle size was found to be 98 nm and solids of 48.5% with a pH of 8.8.

Intermediate Example 2—Preparation of 0.6% PEM Binder

The Intermediate Example 2 binder was prepared substantially as described for the Intermediate Example 1 binder except that MAA (11.0 g) and PEM (16.9 g, 60% active) were used in ME1. The particle size was found to be 96 nm and solids of 49.0% with a pH of 8.4.

Intermediate Example 3—Preparation of 1.2% PEM Binder

The Intermediate Example 3 binder was prepared substantially as described for the Intermediate Example 1 binder except that MAA (4.1 g) and PEM (33.8 g, 60% active) were used in ME1. The particle size was found to be 91 nm, solids content 48.5%, and pH 8.3.

Intermediate Example 4—Preparation of Dispersant Grind Blend, 25/75 Blend of Dispersants Dispersant 1 (63.2% AMPS/35.3% HPA/1.5% AA, 30% solids, $M_n$=1600 g/mol, PDI=3.2) and Dispersant 2 (60% AA/40% HPA, 30% solids, $M_n$=2300 g/mol, PDI=1.5) were blended in a 100-MAX Speed Mixer Cup (total amount 0.38 g in 15.4-17.4 g water) at a w/w ratio of 25:75 Dispersant 1:Dispersant 2. Dry grade $TiO_2$ (76.5 g) was added to cup and the contents were mixed in a Speed Mixer for 2 min at 2200 rpm. Water was added to the mixture to give a total 100 g and mixing was continued for 1 min.

Example 1—Paint Formulation with 0.5% PEM Functionalized Binder and 25/75 Blend of Dispersants The PEM-containing binder from Intermediate Example 1 (56.9 g) was added to a 1-pint plastic container. A portion of the grind preparation from Intermediate Example 4 (24.5 g) was added to the container and the contents were mixed for 10 min. A portion of this mixture (48.6 g) was added to a portion (11.4 g) of a pre-mixed letdown (Texanol coalescent (22.3 g), ACRYSOL RM-2020E Rheology Modifier (22.4 g), ACRYSOL RM-825 Rheology Modifier (0.6 g), TERGITOL 15-S-9 Surfactant (4.0 g), and water (141.4 g)) in a 60-MAX SpeedMixer cup, and the contents were mixed at 2200 rpm for 2 min. The paint was allowed to equilibrate overnight before making drawdowns for hiding measurements.

Kubelka-Munk S/Mil Hiding Test Method

Two draw-downs were prepared on Black Release Charts (Leneta Form RC-BC) for each paint using a 1.5-mil Bird draw down bar and the charts allowed to dry overnight. Using a template, 3.25"×4" rectangles were cut out with an X-ACTO knife on each chart. The Y-reflectance was measured using a BYK Gardner Spectro-guide 45/0 Gloss Color spectrophotometer in each of the scribed areas five times measuring on a diagonal starting at the top of the rectangle and the average Y-reflectance recorded. A thick film draw down was prepared for each paint on Black Vinyl Charts (Leneta Form P121-10N) using a 3" 25-mil block drawdown bar and the charts were allowed to dry overnight. The Y-reflectance was measured in five different areas of the draw down and the average Y-reflectance recorded. Kubelka-Munk hiding value S is given by Equation 1:

$$S = \frac{R}{X \times (1 - R^2)} \times \ln\frac{1 - (R_B \times R)}{1 - \frac{R_B}{R}}$$  Equation 1 where X is the average film thickness, R is the average reflectance of the thick film and $R_B$ is the average reflectance over black of the thin film. X can be calculated from the weight of the paint film ($W_{pf}$), density (D) of the dry film; and film area (A). Film area for a 3.25"×4" template was 13 in².

$$X \text{ (mils)} = \frac{W_{pf} \text{ (g)} \times 1000 \text{ (mil/in)}}{D \text{ (lbs/gal)} \times 1.964 \text{ (g/in}^3\text{/lbs/gal)} \times A \text{ (in)}}$$

Paint formulations were prepared with two different types of TiO₂, PEM-containing latexes from Intermediate Examples 1, 2, and 3, and Dispersant 1:Dispersant 2 ratios ranging from 0:100 to 90:10. Table 1 shows the impact of these variables on S/mil and Table 2 shows the distribution of functional groups of the combined dispersants. Int. Ex. No. refers to Intermediate Example Number of the PEM-containing latex used; Dispersant 1 refers to 63.2% AMPS/35.3% HPA/1.5% AA; and Dispersant 2 refers to (60% AA/40% HPA).

TABLE 1

Hiding Data for Paints Containing PEM-Functionalized Latex and Dispersants

| Example No. | Int. Ex. No. | Dispersant 1 | Dispersant 2 | TiO₂ grade | S/mil |
|---|---|---|---|---|---|
| Comp. 1 | 1 | 0 | 100 | Ti Pure R-706 | 6.3 |
| Comp. 2 | 2 | 0 | 100 | Ti Pure R-706 | 6.7 |
| Comp. 3 | 2 | 0 | 100 | Kronos 2310 | 7.4 |
| Comp. 4 | 3 | 0 | 100 | Ti Pure R-706 | 7.3 |
| Comp. 5 | 3 | 0 | 100 | Kronos 2310 | 7.5 |
| Ex. 1A | 1 | 25 | 75 | Ti Pure R-706 | 6.4 |
| Ex. 1B | 1 | 50 | 50 | Ti Pure R-706 | 7.3 |
| Ex. 1C | 1 | 75 | 25 | Ti Pure R-706 | 7.5 |
| Ex. 1D | 1 | 90 | 10 | Ti Pure R-706 | 7.6 |
| Ex. 2A | 2 | 25 | 75 | Ti Pure R-706 | 6.8 |
| Ex. 2B | 2 | 50 | 50 | Ti Pure R-706 | 7.4 |
| Ex. 2C | 2 | 75 | 25 | Ti Pure R-706 | 7.5 |
| Ex. 2D | 2 | 90 | 10 | Ti Pure R-706 | 7.6 |
| Ex. 3A | 2 | 25 | 75 | Kronos 2310 | 7.5 |
| Ex. 3B | 2 | 50 | 50 | Kronos 2310 | 7.7 |

TABLE 2

Dispersant Composition

| Example No. | Int. Ex. No. | AMPS (%) | AA (%) | HPA (%) |
|---|---|---|---|---|
| Comp. 1 | 1 | 0 | 60 | 40 |
| Comp. 2 | 2 | 0 | 60 | 40 |
| Comp. 3 | 2 | 0 | 60 | 40 |
| Comp. 4 | 3 | 0 | 60 | 40 |
| Comp. 5 | 3 | 0 | 60 | 40 |
| Ex. 1A | 1 | 15.8 | 45.4 | 38.8 |
| Ex. 1B | 1 | 31.6 | 30.7 | 37.7 |
| Ex. 1C | 1 | 47.4 | 16.1 | 36.5 |
| Ex. 1D | 1 | 56.9 | 7.3 | 35.8 |
| Ex. 2A | 2 | 15.8 | 45.4 | 38.8 |
| Ex. 2B | 2 | 31.6 | 30.7 | 37.7 |
| Ex. 2C | 2 | 47.4 | 16.1 | 36.5 |
| Ex. 2D | 2 | 56.9 | 7.3 | 35.8 |
| Ex. 3A | 2 | 15.8 | 45.4 | 38.8 |
| Ex. 3B | 2 | 31.6 | 30.7 | 37.7 |

The data show that grinds made with combinations of dispersant 1 and dispersant 2 steadily improve dry film opacity with increasing levels of dispersant 1. For these examples, a 1.2% PEM binder (Intermediate Example 3) using Dispersant 1 as the sole dispersant demonstrates roughly the same hiding as 0.6% PEM and 0.3% PEM samples using a 50:50 mixture of the two dispersants at the same total dispersant loading. Thus, the combination of the two dispersants is advantageous in part because the same hiding can be achieved with a 50-75% reduction of PEM in the latex particles. Increasing the loading of Dispersant 1 yields diminishing returns at higher levels as the film hiding approaches a maximum; this finding is significant because it has been discovered that optimizing S/mil at minimal loadings of sulfur acid containing dispersants reduces grit formation in the finally formulated paint.

The invention claimed is:
1. A composition comprising:
  a) an aqueous dispersion of:
    i) polymer particles functionalized with from 0.1 to 2 weight percent structural units of a phosphorus acid monomer or salt thereof, based on the weight of the polymer particles; and
    ii) TiO₂ particles;
  b) a first dispersant having an $M_n$ in the range of from 500 to 20,000 Daltons and comprising from 50 to 100 percent by weight structural units of a sulfur acid monomer or a salt thereof, based on the weight of the first dispersant; and
  c) a second dispersant having an $M_n$ in the range of from 300 to 50,000 Daltons and comprising from 20 to 100 weight percent structural units of a carboxylic acid monomer or a salt thereof, based on the weight of the second dispersant;
  wherein the weight to weight ratio of the first to the second dispersant is from 25:75 to 90:10; and wherein the weight percent of the first and second dispersants is from 0.1 to 10 weight percent, based on the weight of the polymer particles and the TiO₂ particles.
2. The composition of claim 1 wherein the polymer particles are functionalized with from 0.2 to 0.8 weight percent structural units of a phosphorus acid monomer or salt thereof, based on the weight of the polymer particles; wherein the polymer particles are acrylic, styrene-acrylic, or vinyl ester-acrylic polymer particles, wherein the concentration of the polymer particles is in the range of from 10 to 50 weight percent, based on the weight of the composition;

and wherein the concentration of $TiO_2$ particles is in the range of from 10 to 70 weight percent, based on the weight of the composition.

3. The composition of either of claims 1 or 2 wherein the first dispersant has an $M_n$ in the range of from 750 to 5,000 Daltons and comprises from 50 to 80 percent by weight structural units of a sulfur acid monomer or a salt thereof, based on the weight of the first dispersant, wherein the sulfur acid monomer is a sulfonic acid monomer; wherein the second dispersant has an $M_n$ in the range of from 500 to 10,000 Daltons and comprises from 40 to 100 percent by weight structural units of a carboxylic acid monomer or a salt thereof, based on the weight of the second dispersant; wherein the weight to weight ratio of the first dispersant to the second dispersant is from 35:65 to 85:15; and wherein the weight percent of the first and second dispersants is from 0.2 to 5 weight percent, based on the weight of the polymer particles and the $TiO_2$ particles.

4. The composition of claim 3 wherein the first dispersant comprises from 15 to 45 weight percent structural units of a monomer selected from the group consisting of 2-hydroxypropyl acrylate, hydroxyethyl methacrylate, and hydroxyethyl acrylate, based on the weight of the first dispersant; wherein the sulfonic acid monomer is 2-acrylamido-2-methylpropane sulfonic acid or a salt thereof; and wherein the second dispersant comprises from 15 to 45 weight percent structural units of a monomer selected from the group consisting of 2-hydroxypropyl acrylate, hydroxyethyl methacrylate, and hydroxyethyl acrylate, based on the weight of the second dispersant; wherein the carboxylic acid monomer or salt thereof is acrylic acid, methacrylic acid, or itaconic acid, or salts thereof.

5. The composition of claim 4 wherein the carboxylic acid monomer is acrylic acid or a salt thereof, wherein the first dispersant comprises from 15 to 45 weight percent structural units of 2-hydroxypropyl acrylate.

6. The composition of claim 5 wherein the polymer particles comprise structural units of methyl methacrylate, butyl acrylate, and methacrylic acid or a salt thereof, wherein the concentration of the phosphorus acid monomer or salt thereof is in the range of from 0.2 to 0.5 weight percent, based on the weight of the polymer particles; wherein the phosphorus acid monomer is phosphoethyl methacrylate or a salt thereof; and wherein the concentration of polymer particles is in the range of from 30 to 50 weight percent, based on the weight of the composition.

7. The composition of claim 6 wherein the weight to weight ratio of the first dispersant to the second dispersant is from 40:60 to 80:20.

8. The composition of claim 1 wherein the total concentration of carboxylic acid functional groups in the combined dispersants is from 11 to 55 weight percent, based on the weight of total dispersants.

9. The composition of claim 1 which further comprises one or more components selected from the groups consisting of rheology modifiers; fillers; colorants; surfactants; defoamers; preservatives; and neutralizing agents.

10. A composition comprising an aqueous dispersion of a) composite particles, which are phosphorus acid-functionalized polymer particles adsorbed to $TiO_2$ particles; b) a first dispersant; and c) a second dispersant; wherein the phosphorus acid-functionalized polymer particles are functionalized with from 0.1 to 2 weight percent structural units of a phosphorus acid monomer or salt thereof, based on the weight of the polymer particles;

wherein the first dispersant has an $M_n$ in the range of from 500 to 20,000 Daltons and comprises from 50 to 100 percent by weight structural units of a sulfur acid monomer or a salt thereof, based on the weight of the first dispersant; and wherein the second dispersant has an $M_n$ in the range of from 300 to 50,000 Daltons and comprises from 20 to 100 weight percent structural units of a carboxylic acid monomer or a salt thereof, based on the weight of the second dispersant;

wherein the weight to weight ratio of the first to the second dispersant is from 25:75 to 90:10; wherein the weight percent of the first and second dispersants is from 0.1 to 10 weight percent, based on the weight of the polymer particles and the $TiO_2$ particles; and wherein the total concentration of carboxylic acid functional groups in the combined dispersants is from 11 to 55 weight percent, based on the weight of total dispersants.

* * * * *